May 4, 1937.                R. CÔTÉ                2,079,153
CIRCUIT CLOSER

Filed Feb. 28, 1936

Inventor:
Raoul Côté
By
Attorney

Patented May 4, 1937

2,079,153

UNITED STATES PATENT OFFICE 2,079,153

CIRCUIT CLOSER

Raoul Côté, St. Lambert, Quebec, Canada

Application February 28, 1936, Serial No. 66,258

2 Claims. (Cl. 200—52)

The present invention pertains to a novel circuit for flashing the tail light of a bicycle when the brake is applied, after the fashion of the stop light of an automobile. The principal object of the invention is to provide a circuit for this purpose operating through certain coaster brake parts and requiring only slight modification of the standard parts for the installation of the circuit.

The standard coaster brake includes a driving nut adapted to engage one end of the brake spool when the brake is to be applied, but otherwise spaced from the spool. The invention employs the movement of the nut in making and breaking the circuit including the tail light. In other words, the circuit is normally broken or opened at said end of the brake spool and is closed when the driving nut engages this end.

Accordingly, one terminal of the lamp is grounded, preferably through the battery, although the battery may be contained in the other side of the circuit if desired. The other side of the circiut is extended through certain of the coaster brake parts by means of a conductor which has a bare end exposed at the aforementioned end of the brake spool although insulated therefrom. The driving nut is also grounded, whereupon the circuit is closed only when the nut engages the aforementioned end of the brake spool and the exposed end of the conductor in the braking action of the device.

The invention is fully disclosed by way of example in the following description and in the accompanying drawing in which Figure 1 is an elevation of the device, showing also the wiring in diagram;

Reference to these views will now be made by use of like characters which are employed to designate corresponding parts throughout.

Figure 1:
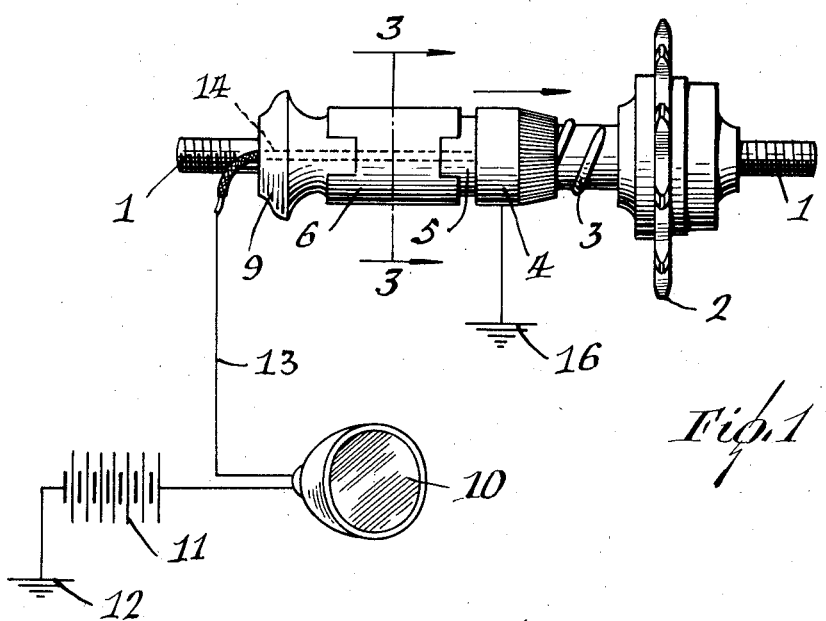
Figure 2:
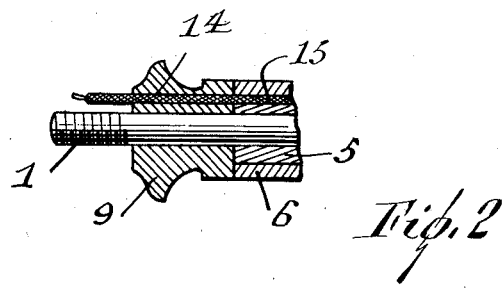
Figure 2 is a detail longitudinal section showing the internal wiring.

In Figure 1 the numeral 1 designates the spindle of the coaster brake assembly on a bicycle. It carries the usual sprocket wheel 2 from which extends the driving worm 3. On the worm 3 is threaded the driving nut and clutch member 4 that brings the sprocket 2 into driving engagement with the rear wheel (not shown) when the rider pedals in the forward direction.

Figure 3:
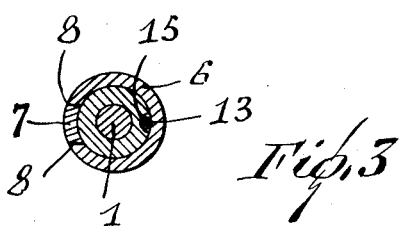
Figure 3 is a section on the line 3—3 of Figure 1.

Next to the nut 4 is the brake spool 5 surrounded by a split brake sleeve 6 on which the wheel hub (not shown) is mounted. A wedge member 7 extends from the nut 4 into the slot 8 of the split brake sleeve 6 as shown more clearly in Figure 3. The remaining ends of the members 5 and 6 are engaged by a cap or cover 9. These parts are conventional in a bicycle coaster brake but are necessary in describing the operation of the invention.

The tail light of the bicycle is designated by the numeral 10, and one of its terminals is connected to one side of a battery 11, the other side of the battery being grounded at 12. A conductor 13 is extended from the other terminal of the lamp 10 and is passed through a hole 14 in the member 9 and then laid in a groove 15 cut lengthwise in the outer surface of the brake spool 5. This conductor is insulated from the parts 9, 5 and 6 but has a bare tip adapted for engagement by the nut 4 when the latter is in the retracted position shown in Figure 1. The nut 4 is grounded as at 16.

In the operation of the device, the nut 4 is normally spaced from the spool 5 as stated above, thereby breaking the electrical circuit. When the brake is to be applied, the movement of the pedals is reversed, thereby driving the nut 4 rearward to the position shown in Figure 1. The brake wedge 7 thereupon expands the brake sleeve 6 against the wheel hub and retards or stops the rotation of the wheel. At the same time, the nut engages the bare or exposed end of the conductor 13 and closes an electrical circuit through the battery 11, tail light 10 and the two grounded ends 12 and 16. The flashing of the tail light obviously gives warning that the rider is about to stop, as in the case of an automobile.

It will now be apparent that the invention requires no special parts other than the conductor and only slight and simple modification of the standard coaster brake parts.

Although a specific embodiment of the invention has been illustrated and described, it will be understood that various alterations in the details of construction may be made without departing from the scope of the invention, as indicated by the appended claims.

What I claim is:—

1. A circuit closer comprising a coaster brake, a driving worm, a driving nut thereon, a brake spool engageable at one end by said nut in the braking action, a conductor having a free bare end exposed at said end of said nut, said conductor being insulated from the coaster brake parts.

2. A circuit closer comprising a coaster brake, a driving worm, a driving nut thereon, a brake spool engageable at one end by said nut in the braking action, a conductor having a free bare end exposed at said end of said nut, said spool having a lengthwise groove in its outer surface receiving a portion of said conductor, said conductor being insulated from the coaster brake parts.

RAOUL CÔTÉ.